Figure 1:
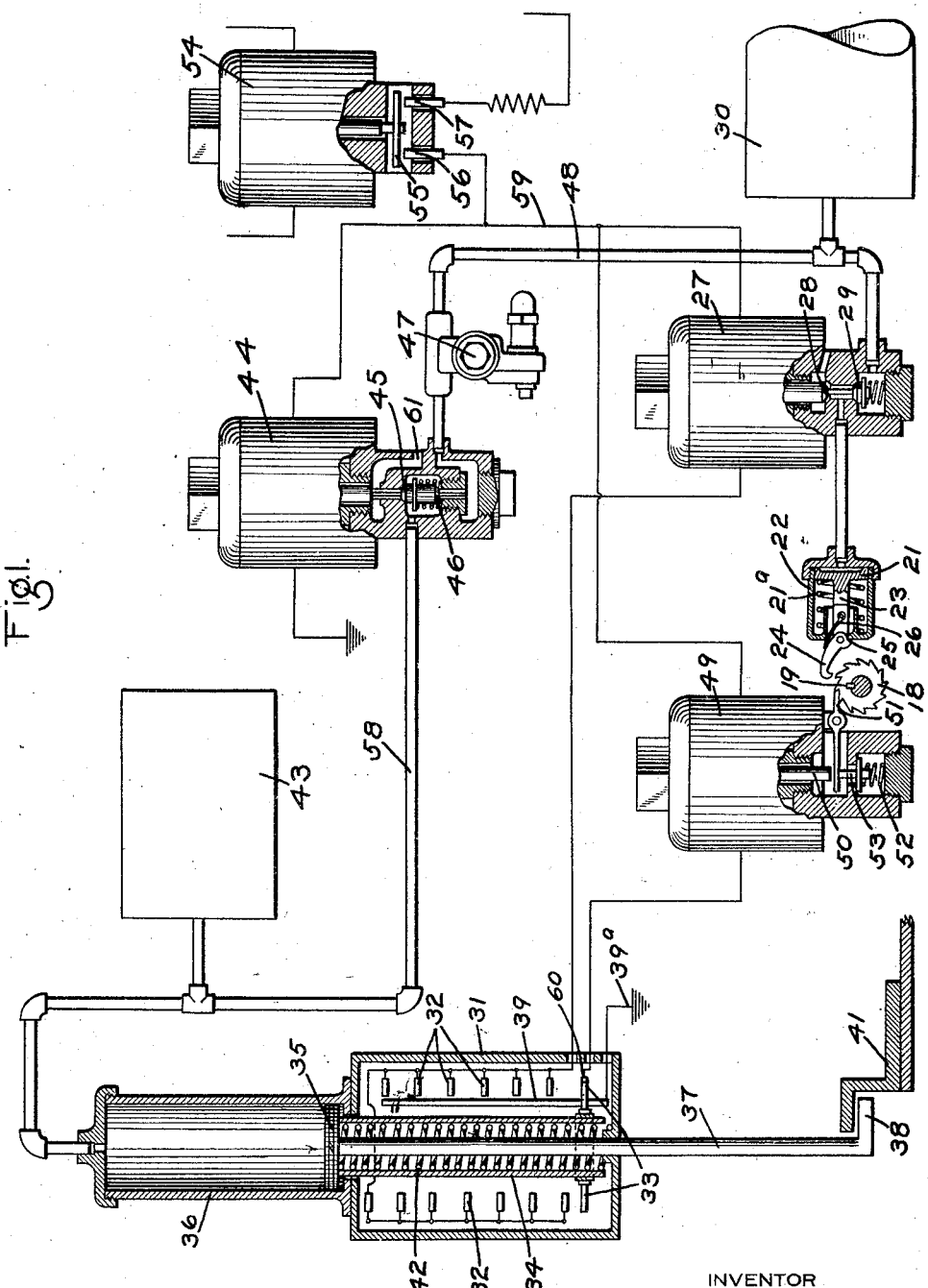

Sept. 28, 1926.　　　　　　　　　　　　　　　　1,601,183
J. C. McCUNE
VARIABLE LOAD BRAKE
Filed Dec. 5, 1925　　　　　2 Sheets-Sheet 1

INVENTOR
JOSEPH C. McCUNE
BY
ATTORNEY

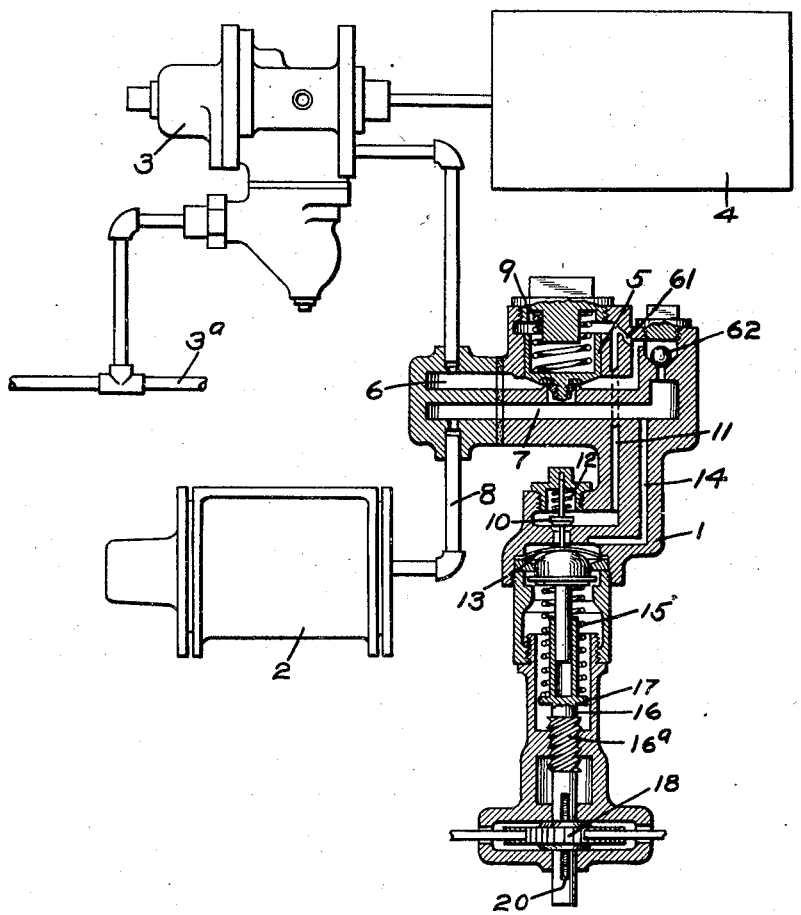

Patented Sept. 28, 1926.

1,601,183

UNITED STATES PATENT OFFICE.

JOSEPH C. McCUNE, OF SOUTH ORANGE, NEW JERSEY, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed December 5, 1925. Serial No. 73,346.

This invention relates to fluid pressure brakes and more particularly to a variable load brake equipment.

It has heretofore been proposed to provide a brake equipment in which the braking power is regulated according to the load on the car and comprising a brake cylinder pressure limiting valve device, and means controlled by variations in the load, as occasioned by passengers entering or leaving the car while the car is standing, for adjusting said brake cylinder pressure limiting valve device to provide a braking power corresponding with the load.

The principal object of my invention is to provide an improved variable load brake equipment of the above character.

In the accompanying drawings, Fig. 1 is a diagrammatic view, partly in section, of a variable load brake equipment embodying my invention; and Fig. 2 a diagrammatic view, partly in section, of the brake cylinder pressure limiting valve device employed in connection with the equipment shown in Fig. 1 and shown associated with a fluid pressure brake apparatus.

In carrying out my invention, I employ a brake cylinder pressure limiting valve device 1, as more clearly shown in Fig. 2, and which is associated with a car brake apparatus comprising the usual brake cylinder 2, triple valve device 3, and auxiliary reservoir 4, the triple valve device being connected to the usual brake pipe 3ª.

The brake cylinder pressure limiting valve device 1 may comprise a casing containing a relay valve piston 5 for controlling communication from a chamber 6, to which fluid is supplied when the triple valve device is operated to effect an application of the brakes, to a chamber 7, which is connected by a pipe 8 to the brake cylinder 2, said valve piston being subject on one side to the pressure of a coil spring 9 and on the outer seated area of the opposite side to the pressure of fluid in the chamber 6.

For controlling the operation of the valve piston 5, a valve 10 is provided, which is adapted to control the venting of fluid from the spring side of the valve piston 5, through a passage 11, and is normally held seated by a spring 12. The operation of the valve 10 is controlled by a flexible diaphragm 13, which is subject on one side to the pressure of fluid in the brake cylinder 2 as supplied through pipe 8, chamber 7, and passage 14, and on the opposite side to the pressure of an adjustable coil spring 15.

In order to vary the pressure exerted by spring 15 on diaphragm 13, I provide a movable member 16, having a collar 17, which engages one end of the spring 15, and a screw-threaded portion 16ª, having screw-threaded engagement in a partition wall of the casing, so that when the member 16 is rotated it will be moved longitudinally, so as to compress the spring 15.

The member 16 is adapted to be rotated by means of a ratchet wheel 18, which is slidably mounted on the member 16 and is provided with a key 19 adapted to slide in a key-way 20 provided in said member, so that the rotation of the ratchet wheel rotates the member, but at the same time the member is free to move longitudinally relative to the ratchet wheel.

The rotation of the ratchet wheel is effected by apparatus which will now be described. Associated with the ratchet wheel 18 is an operating device comprising a piston 21 subject on one side to the pressure of a spring 21ª and contained in a cylinder 22, said piston having a stem 23 on which is pivotally mounted a pawl 24, which is adapted to engage the teeth of the ratchet wheel 18. The pawl 24 is adapted to be disengaged from the ratchet wheel 18, when piston 21 is in its innermost position, by the engagement of a lug 25 of the pawl with the end wall of cylinder 22, and to be forced into engagement with said ratchet wheel, when piston 21 is in its outermost position, by a spring 26, acting on said pawl.

A magnet 27, which is adapted to operate double beat valves 28 and 29, is provided to control the admission and exhaust of fluid under pressure to and from the cylinder 22. When the magnet is energized, the valve 28 is seated and the valve 29 is unseated to supply fluid from a main reservoir 30 to cylinder 22, so that piston 21 is forced to its outermost position, in which the pawl 24 engages the ratchet wheel 18, and when deenergized, the valve 29 will be seated, cutting off the supply of fluid, and valve 28 unseated to connect the cylinder 22 to atmosphere, causing the piston 21 to be shifted by spring 21ª to its inner position, so that by alternately energizing and deenergizing the magnet 27, the piston 21 is caused to reciprocate in its cylinder and the pawl 24 to operate the ratchet wheel 18, so as to rotate the member 16 step by step and thereby adjust the compressive force of spring 15 on the diaphragm 13.

The alternate energization and deenergization of magnet 27 may be effected by a switch device 31 comprising a casing in which a plurality of spaced contacts 32 are positioned, the contacts being preferably arranged in two rows, with the contacts of one row in staggered relation to the contacts of the other row. The contacts 32 are connected into the circuit of magnet 27 and are engageable by a movable contact 33, which is carried by a sleeve member 34. The sleeve member is carried by a piston 35 contained in a cylinder 36 and connected to the piston is a rod 37 having a right angle projection 38 at its extremity. The contact 33 is always in engagement with a contact bar 39 connected to ground at 39ª, and is therefore adapted, upon movement of piston 35, to alternately engage and disengage the successive contacts 32, so as to alternately make and break the circuit of magnet 27.

In order to control the operation of the switch device 31 and consequently magnet 27 according to the load on the car, said switch device and its associated cylinder is mounted on the car body and a member 41 is mounted on the car truck, so that the projection 38 of the piston rod 37 will engage said member after movement of piston 35 according to the position of the car body, which in turn is determined by the load on the car and the amount the car springs are compressed.

The piston 35 is employed, so as to provide a dash pot action of switch device 31 and thus slow down the movement, to permit time for the desired operation of the ratchet wheel operating device, said piston being subject on one side to the pressure of fluid in cylinder 36, and on the opposite side to the pressure of a coil spring 42.

The volume of the cylinder 36 is augmented by a timing reservoir 43, so that the desired dash pot action may be obtained, and a magnet 44, which is adapted to operate double beat valves 45 and 46, is provided to control the supply and exhaust of fluid to and from said reservoir and cylinder. A feed valve device 47 is interposed in a pipe 48, through which fluid under pressure is supplied from the main reservoir 30 to one side of double beat valve 46, so that the pressure of fluid supplied to the timing reservoir 43 and cylinder 36 will be maintained constant.

In order to lock the ratchet wheel 18 in its adjusted position, an electrically controlled locking device is provided, comprising a magnet 49, having a plunger 50, which is adapted when said magnet is energized to engage a lever extension of a pawl 51 pivotally mounted on the magnet casing. The pawl 51 is held in engagement with ratchet wheel 18, when magnet 49 is deenergized by a spring 52 acting through stem 53.

The supply of current to the circuits of magnets 27, 44, and 49 is controlled by a counter electromotive force relay 54, which is energized by current from the car motor when the motor is running, and is deenergized when the motor is not running. The relay 54 is adapted to operate a contact bar 55, so that when said relay is deenergized, the bar 55 will bridge contacts 56 and 57, thereby completing the circuit to the magnets, and when energized will retract said bar so that the circuit will be broken.

When the car is running, the relay 54 will be energized, causing the contact bar 55 to move away from contacts 56 and 57, so that the circuit of the magnet 44 will be broken, thus deenergizing said magnet, so that double beat valve 45 will be seated and valve 46 unseated, permitting fluid under pressure from main reservoir 30 to flow through pipe 48 and feed valve device 47, past unseated valve 46 and through pipe 58 to the timing reservoir 43 and to cylinder 36. The pressure of fluid so supplied to cylinder 36 forces the piston 35 to its outermost position, in which the contact 33 carried by sleeve member 34 engages a contact 60 connected to one terminal of a magnet 49, so that when the car is running, the magnet 49 is connected through contact 33 and contact bar 39 to ground. The magnet 27 is also deenergized while the car is running, so that double beat valve 29 is held closed and the valve 28 open, thus maintaining the piston 21 at atmospheric pressure.

When the car is brought to a stop, the relay 54 will be deenergized, as hereinbefore explained, causing contact bar 55 to descend, so that it bridges contacts 56 and 57, thereby supplying current to magnet 49, so as to energize said magnet.

The energization of magnet 49 causes the plunger 50 to engage the lever extension of pawl 51, so as to disengage said pawl from the ratchet wheel 18. The pitch of screw threaded portion 18 is such that the pressure of spring 15 is capable of rotating the member 16 to empty car position as soon as the pawl 51 is disengaged from ratchet wheel 18, so that a complete readjustment is effected at each stop.

Current is also supplied through wire 59 to magnet 44, thereby energizing said magnet and causing double beat valve 46 to be seated, thus cutting off the supply of fluid from main reservoir 30 to reservoir 43 and cylinder 36, and valve 45 to be unseated so as to connect said reservoir and cylinder to atmosphere, by way of pipe 58, past unseated valve 45, and atmospheric exhaust port 61.

As the pressure of fluid in cylinder 36 and reservoir 43 is reduced as just described, the pressure exerted by spring 42 on the opposite side of piston 35 moves said piston outwardly in cylinder 36, which consequently moves contacts 33. The initial movement of piston 35 moves contacts 33 so as to break the circuit of magnet 49, thereby deenergizing said magnet. The deenergization of magnet 49 causes the plunger 50 to be retracted, so that the spring 52 acting through stem 53 forces the pawl 51 into enagement with ratchet wheel 18, thereby locking said wheel against counterclockwise rotation.

As the piston 35 continues to move outwardly, the contacts 33 alternately engage and disengage succeeding contacts 32, causing alternate energization and deenergization of the magnet 27. The energization of magnet 27 causes the double beat valve 28 to be seated and valve 29 to be unseated, so as to permit fluid under pressure from the main reservoir 30 to flow past said unseated valve and through pipe 60 to cylinder 22, where it acts to shift piston 21 to its innermost position.

The outward movement of the piston 21 moves the pawl 24 so as to disengage the lug 25 from the cylinder 22, permitting spring 26 to force said pawl into engagement with ratchet wheel 18. When the fluid is exhausted from cylinder 22 by deenergization of magnet 27, the spring 21ª acts to return piston 21 and pawl 24, so that the pawl effects the rotation of the ratchet wheel 18 a certain amount and causes a corresponding rotation of movable member 16, the ratchet wheel 18 being locked against rotation in the opposite direction by the engagement of the pawl 51 with one of the teeth of the ratchet wheel.

The action just described is repeated alternately during the entire outward movement of the piston 35 and stem 37, which is governed by the position of the car body with respect to the car truck, since the piston and stem can only move until the projection 38 engages the member 41 carried by the car truck. The amount that the ratchet wheel 18 and movable member 16 is rotated is therefore proportional to the load on the car.

The brake cylinder pressure limiting valve device is thus adjusted according to the load as varied by passengers entering or leaving the car, while the car is stopped. When current is supplied to the car motors and the car is started, current is also supplied to the relay 54, so that the contact bar 55 is operated to open the circuit between contacts 56 and 57, which in turn causes the deenergization of the magnets 44, 27, and 49.

The deenergization of magnet 44 causes the double beat valve 45 to be seated and valve 46 to be unseated so as to permit fluid under pressure from main reservoir 30 to flow through pipe 48 and feed valve device 47 past unseated valve 46 and through pipe 58 to timing reservoir 43 and cylinder 36. The pressure of fluid so supplied acts to shift piston 35 and stem 37 with projection 38 to a position in which the movement of member 41 will not have any effect on projection 38 of stem 37.

When it is desired to bring the car to a stop, the pressure in the brake pipe 3ª is reduced in the usual way so as to actuate the triple valve device 3 to supply fluid under pressure from the auxiliary reservoir 4, to chamber 6 of the brake cylinder pressure limiting valve device.

The fluid under pressure so supplied to chamber 6 acts on the outer seated area of relay valve piston 5, unseating said valve, against the pressure exerted by spring 9, and flows to chamber 7, thence through pipe 8 to the brake cylinder 2. Fluid from chamber 6 also flows through restricted passage 61 to the spring side of valve piston 5, but so long as the valve 10 remains unseated, fluid will not build up thereon, since fluid so supplied is vented, through passage 11, past unseated valve 10, through passage 14, chamber 7 and pipe 8 to the brake cylinder 2.

When the pressure of fluid in the brake cylinder 2 and consequently on diaphragm 13 of the limiting valve device has increased to a degree slightly greater than the pressure exerted on the opposite side of said diaphragm by the spring 15, the diaphragm will be moved, so as to permit the valve 10 to be seated by the spring 12.

The seating of valve 10 prevents further escape of fluid from the spring side of valve piston 5, so that the pressure of fluid on opposite sides thereof will quickly equalize and permit said valve piston to be seated by the spring 9, thereby preventing further flow of fluid to the brake cylinder 2. It will be evident that since the pressure exerted by the spring 9 has been adjusted in proportion to the load on the car, as hereinbefore described, the maximum pressure of fluid supplied to the brake cylinder will also be limited according to the load on the car.

The release of the brakes is effected in the usual way by increasing the pressure in the brake pipe 3ª, which causes the triple valve device 3 to release the fluid from the brake cylinder by way of pipe 8, chamber 7, past ball check 62 to chamber 6 and through the triple valve device to atmosphere.

Having now described my invention, what I claim as new and desire to secure by Letters Patent, is:—

1. In a load brake apparatus, the combination with an adjustable device for limiting the braking power according to the load on the car, of means operated by the making and breaking of an electric circuit for adjusting said device, and means movable to an extent depending upon the load on the car for making and breaking said electric circuit.

2. In a load brake apparatus, the combination with an adjustable device for limiting the braking power according to the load on the car, of means operated by the making and breaking of an electric circuit for adjusting said device, and means movable according to the load on the car for alternately making and breaking said electric circuit.

3. In a load brake apparatus, the combination with an adjustable device for limiting the braking power according to the load on the car, of a fluid pressure motor device operated by the admission and exhaust of fluid under pressure for adjusting said adjustable device, electrically controlled means operated by the making and breaking of an electric circuit for admitting and exhausting fluid to and from said motor, and means controlled according to the load on the car for making and breaking said electric circuit.

4. In a load brake apparatus, the combination with adjustable means operated by the making and breaking of an electric circuit for limiting the braking power, of an electric switch device operated when power is cut off from the car motors for connecting said circuit to a source of electric current, and means movable according to the load on the car for alternately making and breaking said electric circuit.

5. In a load brake apparatus, the combination with electrically controlled means for limiting the braking power, of a counter-E. M. F. relay for controlling the circuit of said electrically controlled means.

6. In a load brake apparatus, the combination with electrically controlled means for limiting the braking power, of a switch for controlling the connection of said means to a source of electric circuit and a counter-E. M. F. relay for controlling said switch.

7. In a load brake apparatus, the combination with means operated by the making and breaking of an electric circuit for adjusting the braking power, of means operated according to the load on the car for making and breaking said electric circuit, a counter-E. M. F. relay, and a switch controlled by said relay for controlling the connection of said circuit to a source of current.

8. In a load brake apparatus, the combination with means for limiting the braking power, of a device operated according to the load on the car for adjusting said means, and means for effecting the movement of said device to empty car position when the car motors are supplied with electric current.

9. In a load brake apparatus, the combination with means for limiting the braking power, of a device operated according to the load on the car for adjusting said means, a counter-E. M. F. relay, and means controlled by said relay for effecting the movement of said device to empty car position.

10. In a load brake apparatus, the combination with means operated by the making and breaking of an electric circuit for adjusting the braking power, of a switch device operated according to the load on the car for alternately making and breaking said electric circuit and means for moving said switch device at a predetermined rate.

11. In a load brake apparatus, the combination with means operated by the making and breaking of an electric circuit for adjusting the braking power, of a switch device operated according to the load on the car for alternately making and breaking said electric circuit, a spring for actuating said switch device, a piston subject to fluid under pressure for opposing movement of said switch device, and means for venting fluid from said piston at a predetermined rate.

12. In a load brake apparatus, the combination with means operated by the making and breaking of an electric circuit for adjusting the braking power, of a switch device operated according to the load on the car for alternately making and breaking said electric circuit, a spring, a piston subject to the opposing pressures of said spring and fluid under pressure for operating said switch device, and means for venting fluid from said piston at a predetermined rate.

13. In a load brake apparatus, the combination with means operated by the making and breaking of an electric circuit for adjusting the braking power, of a switch device operated according to the load on the car for alternately making and breaking said electric circuit, a spring, a piston subject to the opposing pressures of said spring and fluid under pressure for operating said switch device, and electrically controlled means operated when the car is running for maintaining the fluid pressure on said piston and when the car is stopped for venting fluid from said piston.

14. In a load brake apparatus, the combination with means operated by the making and breaking of an electric circuit for adjusting the braking power, of a switch device operated according to the load of the car for alternately making and breaking said electric circuit, a spring, a piston subject to the opposing pressures of said spring and fluid under pressure for operating said switch device, and electrically controlled means operated upon deenergization of the car motors for venting fluid from said piston.

15. In a load brake apparatus, the combination with a valve mechanism for regulating the braking power and including an adjustable spring, of a screw-threaded member rotatable to compress said spring, a ratchet wheel for rotating said member, a pawl for operating said ratchet wheel, and means for operating said pawl.

16. In a load brake apparatus, the combination with a valve mechanism for regulating the braking power and including an adjustable spring, of a screw-threaded member rotatable to compress said spring, a ratchet wheel for rotating said member, a reciprocating pawl for operating said ratchet wheel, and fluid pressure operated means for reciprocating said pawl.

17. In a load brake apparatus, the combination with a valve mechanism for regulating the braking power and including an adjustable spring, of a screw-threaded member rotatable to compress said spring, a ratchet wheel for rotating said member, a reciprocating pawl for operating said ratchet wheel, and means operated by the alternate admission of fluid under pressure to and the exhaust therefrom for reciprocating said pawl.

18. In a load brake apparatus, the combination with a valve mechanism for regulating the braking power and including an adjustable spring, of a screw-threaded member rotatable to compress said spring, a ratchet wheel for rotating said member, a reciprocating pawl for operating said ratchet wheel, a piston operated by the alternate admission of fluid under pressure to and the exhaust therefrom for reciprocating said pawl, and electrically controlled means for admitting and exhausting fluid under pressure to and from said piston.

In testimony whereof I have hereunto set my hand.

JOSEPH C. McCUNE.